US012098995B2

(12) United States Patent
Lukács et al.

(10) Patent No.: US 12,098,995 B2
(45) Date of Patent: Sep. 24, 2024

(54) METHOD AND MEASURING ARRANGEMENT FOR DETERMINING THE INTERNAL CORROSION RATE OF STEEL STRUCTURES

(71) Applicants: Zoltán Lukács, Szeged (HU); László Gubicza, Balatonfüred (HU); Gábor Gubicza, Veszprém (HU)

(72) Inventors: Zoltán Lukács, Szeged (HU); László Gubicza, Balatonfüred (HU); Gábor Gubicza, Veszprém (HU)

( * ) Notice: Subject to any disclaimer, the term of this patent is extended or adjusted under 35 U.S.C. 154(b) by 151 days.

(21) Appl. No.: 17/800,764

(22) PCT Filed: Feb. 15, 2021

(86) PCT No.: PCT/HU2021/050012
§ 371 (c)(1),
(2) Date: Aug. 18, 2022

(87) PCT Pub. No.: WO2021/165709
PCT Pub. Date: Aug. 26, 2021

(65) Prior Publication Data
US 2023/0102362 A1 Mar. 30, 2023

(30) Foreign Application Priority Data

Feb. 20, 2020 (HU) .................. P2000060

(51) Int. Cl.
*G01N 17/02* (2006.01)
*G01N 17/00* (2006.01)
*G01N 17/04* (2006.01)

(52) U.S. Cl.
CPC ........... *G01N 17/02* (2013.01); *G01N 17/006* (2013.01); *G01N 17/04* (2013.01)

(58) Field of Classification Search
CPC ...... G01N 17/02; G01N 17/006; G01N 17/04; G01N 27/026; G01N 17/00; G01N 27/00; G01N 27/02; G01N 27/04
(Continued)

(56) References Cited

U.S. PATENT DOCUMENTS

| 5,519,330 | A | * | 5/1996 | Yamauchi | G01N 17/02 324/71.2 |
| 7,245,132 | B1 | * | 7/2007 | Poirier | G01N 17/02 205/775.5 |

(Continued)

FOREIGN PATENT DOCUMENTS

| CN | 107941686 A | * | 4/2018 | ........... G01N 17/006 |
| CN | 108535178 A | | 9/2018 | |

*Primary Examiner* — Tung X Nguyen
*Assistant Examiner* — Robert P Alejnikov, Jr.
(74) *Attorney, Agent, or Firm* — Olson & Cepuritis, Ltd.

(57) ABSTRACT

Methods for determining the internal corrosion rate of steel pipelines. During the methods the calibration constant is determined under laboratory conditions then by using the calibration constant field conditions are modeled under laboratory conditions and the corrosion rate is determined, then in the same manner as under laboratory conditions the corrosion rate is determined under field conditions. Further, the invention is a measuring arrangement for determining the calibration constant and the corrosion rate for the internal corrosion rate of steel pipelines (1) the arrangement is applicable to carry out the methods under laboratory and field conditions. The arrangement consists of a polarizing and measuring unit (5) having a two-channel power output (2), a potential-measuring input (3), and a ground connection (4), a control and data storage unit (6), and three probes (8) with counter-electrodes (7). At least one probe (8) is also provided with a reference electrode (9).

11 Claims, 2 Drawing Sheets (58) Field of Classification Search
USPC .......................................................... 324/700
See application file for complete search history.

(56) References Cited

U.S. PATENT DOCUMENTS

| | | | |
|---|---|---|---|
| 7,282,928 B1* | 10/2007 | Hladky | G01N 17/02 |
| | | | 205/775.5 |
| 10,031,066 B1* | 7/2018 | Brown | G01N 17/02 |
| 11,467,083 B2* | 10/2022 | Al-Khaldi | G01N 17/043 |
| 2008/0036476 A1* | 2/2008 | Nielsen | G01N 17/02 |
| | | | 324/700 |

* cited by examiner

METHOD AND MEASURING ARRANGEMENT FOR DETERMINING THE INTERNAL CORROSION RATE OF STEEL STRUCTURES

CROSS-REFERENCE TO RELATED APPLICATIONS

This application is a U.S. National Stage of PCT/HU2021/050012, filed Feb. 15, 2021, which claims priority to Hungarian Application No. P2000060, filed Feb. 20, 2020, each of which are incorporated herein by reference.

The present invention relates to methods for determining the internal corrosion rate of steel pipelines. In the application of the methods the calibration constant is determined under laboratory conditions then by using the calibration constant field conditions are modeled under laboratory conditions and the corrosion rate is determined, then in the same manner as under laboratory conditions the corrosion rate is determined under field conditions.

The invention further relates to a measuring arrangement for determining the calibration constant and the corrosion rate for the internal corrosion rate of steel pipelines, the arrangement is applicable to carry out the methods under laboratory and field conditions. The arrangement consists of a polarizing and measuring unit having a two-channel power output, a potential-measuring input, and a ground connection, a control and data storage unit, and three probes with counter-electrodes. At least one probe is also provided with a reference electrode.

The corrosion rate of the inner surface of pipelines is typically determined by the coupon, the LPR and the ER techniques (corrosion monitoring). The common imperfectness of all three solutions is that instead of the corrosion rate of the pipe wall itself, the corrosion of a separate specimen introduced into the system is measured. Due to this fact the measurement implies significant uncertainty. The solution would be to polarize the pipe wall itself in a suitable manner and to determine the polarization resistance of the pipe wall from this polarization, from which the corrosion rate can be calculated by the method used in the LPR method or any other electrochemical polarisation technique commonly used for the determination of corrosion rate.

The corrosion rate in an industrial environment can be determined basically by three technical solutions:

1) Mass loss measurement. During this process, specimens of known mass (so-called coupons) are placed in the corrosive medium and after a certain time they are taken out, cleaned and weighed and the corrosion rate is calculated from the mass loss. The advantage of the method is that it is a simple and direct measurement, the disadvantage is that it is slow and provides information with delay or does not provide information at all about the outcomes of the changes in the corrosive medium, thus worsening the possibilities of intervention. It can be used in all kinds of medium (oil, gas, water).

2) The essence of the ER (Electrical Resistance) method is that the specimen is a metal wire the resistance of which is measured very accurately. The corrosion rate is calculated from the changes in the resistance of the wire. This method is also relatively slow and inaccurate. The advantage of it is that it can be used in oily and gaseous medium similarly to the mass loss measurement. Its use in aqueous medium is highly limited.

3) LPR (Linear Polarization Resistance) measurement. The technology development discussed here is based on this method. The essence of it is that a voltage difference is created between the two electrodes placed in the corrosive medium and the current response is measured. If the voltage perturbation is small enough (<15 mV) and some other conditions are fulfilled, the current response will be linear (as if measured on an equivalent circuit of ohmic resistors and a capacitor) and the specified so-called polarization resistance will negatively correlate with the corrosion rate of the surface of the electrodes (the lower the resistance, the higher the corrosion rate). The application of the method requires a minimum of two electrodes, called working and counter electrode. Optionally, a third electrode can be used which is not polarized, it is needed only for potential measurement. This is the reference electrode. If a reference electrode is used, the potential signal is measured relative to this at the working electrode (however, the current still flows between the working electrode and the counter electrode).

For accurate application of the method, the resistance value of the solution must be known and the value of the solution resistance must be corrected (subtracted from the overall resistance figure). For this purpose, often two measurements are made, both with alternating current, one at high (about 1000 Hz) and the other at low (about 1 Hz) frequency. In the case of high-frequency measurement, only the value of the solution resistance is measured, and in the case of low-frequency measurement, the sum of the two types of resistance. (The surface resistance of the electrodes, which is related to the corrosion rate, is practically zero, quasi short circuited during the high frequency measurement due to the so-called double layer capacity arising in parallel coupling.)

The difference between the two results gives the polarization resistance of the electrode, which is related to the value of the current as follows:

$$j_{corr}=(2{,}303(b_a^{-1}-b_c^{-1}))^{-1}R_P^{-1}$$

Where $b_a$ and $b_c$ are the value of the so-called anodic and cathodic slope, which is well approximated by values 0.06V and −0.12V in most corrosion systems, and $R_P$ is the polarization resistance. The specified corrosion current $j_{corr}$ is related to the corrosion rate (expressed in g/cm²/hour) as follows:

$$r = \frac{j_{corr}}{AF}\frac{M}{n}*3600$$

Where r is the corrosion rate, A is the electrode surface (cm²), F is the Faraday constant (96500 As/mol) and M is the molar mass of iron (56 g/mol), the value of n is 2 for corrosion of iron and steels.

In practice, in LPR corrosion monitoring procedures, the working and counter electrodes are typically threaded steel rods at one end, which are screwed into a properly formed steel support, the rods are isolated from each other and from the support and are connected to the corrosion rate meter by means of suitable wires.

http://www.corrscience.com/products/corrosion/intro-to-corrosion/linear-polarization-resistance-monitoring-lpr/)

This description basically describes a method developed for corrosion monitoring of pipelines. In the method, one of the electrodes of the monitoring system is the pipe wall itself. This makes it possible (at the cost of installing a third reference electrode) to measure the polarization resistance of the pipe wall and to directly monitor the corrosion rate of the pipe wall. This is necessary because the pipe wall, which has been there for a long time, often for decades, may present quite different corrosion properties than a monitoring electrode which needs to be replaced at least every two years (possibly much more often in highly corrosive media). The technical value, reliability and richness of information of electrochemical measurements carried out directly on the pipe wall are definitely an advantage that is worth satisfying certain conditions. If the pipe wall is the working electrode, it is essential to use a reference electrode. In this case, one electrode of the standard two-electrode probe is the counter electrode and the other is the reference electrode.

1) If the pipe wall itself is used as a monitoring electrode, a very complicated and possibly time-varying potential distribution may take place on it which on the one hand polarizes the individual surface portions to a significantly different extent and on the other hand makes the approximate determination of the polarized surface uncertain (determination of the corrosion rate can anyway be highly inaccurate therefore the requirement for accuracy for technological measurements is at least moderate, but the uncertainty of the size of the corroding surface and the wide range of potential would in any case result in an error which is intolerable or significantly degrades the values arising from the advantages of the method). Therefore, the proposed method instead of one probe uses three installed at well-defined distances and positions from each other in order to make the potential distribution more uniform in the geometric environment of the middle active working electrode and to make the associated corroding surface more accurately determinable.

2) Calculating the polarization resistance of a pipe wall is difficult because if it is polarized (e. g. through electrodes built into an LPR probe), we cannot predetermine the surface area of the polarized pipe wall section or the distribution of the polarizing current. Therefore it is necessary to apply three electrodes, arranged equidistantly along the generator of the pipe wall, in order to create an approximately symmetric and homogeneous potential and current distribution in the space of the central electrode.

More specifically, the corrosion rate can be determined from the value of the polarization resistance by the following relationship between the polarization resistance and the corrosion current:

$$R_P = \frac{(E - E_{corr})}{J} = \left(J_{corr} 2,303\left(\frac{1}{b_A} - \frac{1}{b_C}\right)\right)^{-1}$$

where $E-E_{corr}$ is the difference between the polarized potential and the corrosion (rest) potential of the corroded metal surface, J is the polarization current for the actual polarized potential, $R_P$ is the polarization resistance (its dimension: [resistance], characteristic unit of measurement $\Omega$), $J_{corr}$ is the corrosion current (its dimension: [current], characteristic unit of measurement: A), and $b_A$ and $b_C$ are the so-called anodic and cathodic decadic Tafel slopes, their values are conventionally $b_A$=0.06 V and $b_C$=−0.12 V.

The corrosion rate is determined from the value of the corrosion current using the following equation:

$$K = \frac{J_{corr} M_{Fe}}{AnF} s$$

where K is the corrosion rate (its dimension: [mass/time/length$^2$], characteristic unit of measurement: g/year/cm$^2$), n is the stoichiometric number of the corrosion process, for iron and steels it is 2, F is the Faraday constant, it is 96494 As/mol and $M_{Fe}$ is the molar mass of iron, 56 g/mol and the number of seconds in one year, 31536000, and A is the size of the corroding surface its dimension: [length$^2$].

To measure LPR in the industrial environment probes arranged in a known manner are used. Generally, two types of design are used, two- and three-electrode types. The probes are installed in the pipeline in a known manner.

The operation of an LPR probe is as follows: a time-varying voltage (typically a triangular signal, typically with an amplitude of 10-15 mV and a frequency of about 1 Hz or less) is emitted from a power source with a controllable output between two electrodes of the LPR probe. Voltage and current are re-measured. If there is a third electrode in the probe, this third electrode is used as a reference electrode and the potential of another electrode is measured against it. From the current and voltage values, (knowing the surface of the probes) the electrical resistance of the system is calculated, which consists of two terms: the ohmic resistance of the solution and the polarization resistance:

$$R_\Sigma = R_\Omega + R_P,$$

where $R_\Sigma$ is the measured (total) resistance and $R_\Omega$ is the solution resistance. The difference between the two is the $R_p$ polarization resistance defined in the first equation.

The solution resistance $R_\Omega$ is either neglected (this does not cause a significant error in well-conducting, aggressive saline solutions) or its value can be determined by high-frequency impedance measurements as shown in the EIS measurement.

Probes similar to those used for LPR measurements are used for industrial EIS measurements, the difference is in the measuring electronics and the polarization waveform.

The transmission function (impedance) of electrochemical corrosion systems for low amplitude (max. 10-15 mV) alternating voltage (preferably sinusoidal) perturbations can be presented by the so-called equivalent circuit. The equivalent circuits of corrosion systems can be well modeled by a circuit where the polarization resistance ($R_p$) and the interfacial double layer capacity ($C_{DL}$) are coupled in parallel, and the ohmic resistance ($R_\Omega$) of the solution is coupled in series to these. The impedance of this equivalent circuit is:

$$Z = R_\Omega + \frac{R_P}{1 + i\omega\tau}$$

If the equation is plotted on a Nyquist diagram, it can be seen from the low frequency impedance values (typically around 10-100 mHz), intersecting the real axis, equal to the sum of the solution resistance and the polarization resistance and the high frequency impedance data (above 1 kHz), intersecting or approaching also the real axis, the solution resistance can be determined. In this way, the polarization resistance, which is essential for determining the corrosion rate, can be determined from the distance of the two intersections. Often, high-frequency impedance measurements are also performed in case of LPR measurements in order to determine the solution resistance, and the polarization resistance obtained there is corrected with the data gained.

There are other arrangements for special needs, but a common feature of them is that the electrodes are always inserted into the system in isolation from the corroding system. In some cases, three-electrode probes are used, in which the third electrode only acts as a reference electrode (the potential of the unloaded electrode can be treated as constant for a short time during the measurement).

International patent application WO2015200899A1 (Linear Polarization Resistance Flex Sensors and Methods that Involve Structure as Working Electrode) discloses linear polarization resistance sensors and a method which also includes the arrangement of the working electrodes). This document uses LPR and/or EIS and/or other electrochemical polarization methods.

A common feature of this application and of the present invention is that both use the same measurement-calculation methods (LPR and/or EIS and/or other electrochemical polarization methods) that are widely known and are in use for decades. Both polarize the structural material (pipe wall) to determine the corrosion rate.

However, there are significant differences between the two patents. The physical implementation, the sensors used, the electrodes, the measurement geometry, the auxiliary materials used and the mechanical arrangement (e. g. fixing) show no similarities. Another important difference is that while in the case of the above-mentioned patent the film containing the electrodes has to be fixed to the structural material, which is technically more than problematic, the sensors of the present invention can be installed using standard threaded access fittings.

Chinese Patent Application No. CN108535178 discloses a device and method for online monitoring the corrosion rate of pipelines. The device includes an electrochemical test system, a piece hanging system, corresponding valves, a flow meter, and the like. The method for monitoring the corrosion rates online includes the following steps:

1) mounting to-be-monitored counter electrodes and corrosion test pieces and adjusting the flow rates of liquid which flows through the device so that the flow rate of the liquid is consistent with the flow rates of liquid in the pipelines of systems;

2) measuring the linear polarization resistance by the aid of linear polarization processes;

3) measuring the solution resistance between the electrodes by the aid of constant-current processes;

4) dividing the values by 2 to obtain anodic polarization resistance (R);

5) acquiring B values by considering the weight loss correction processes of the tested piece;

6) computing the corrosion rates I<corr> according to an equation of I<corr>=B/R;

The values obtained at the step 4) are subtracted from the linear polarization resistance. The advantages of the device and the method are that the anodic polarization resistance R can be measured accurately, the B values can be obtained by the aid of the weight loss correction processes of the tested piece, and accordingly the internal corrosion rates of the pipelines can be monitored accurately and continuously online manner in real time.

The above-mentioned method uses separate test electrodes for monitoring the corrosion of the pipeline and not the pipe wall itself. This is an essential difference in the technique of measurement.

Patent Application U.S. Pat. No. 10,031,066B1 discloses systems and methods for monitoring corrosion of a structure by using the structure itself as part of the electromechanical measurement. According to some implementations, linear polarization resistance (LPR) sensor devices for direct monitoring of corrosion on a structure are presented. According to certain innovations therein, a sensor device may include three electrodes, such as a counter electrode, a reference electrode, and a working electrode comprised of the structure being monitored. In further embodiments, each electrode may be configured on a polymer flexible substrate cable such as polyimide, with each electrode fabricated from a noble metal, for example, gold-plated copper, or metal systems in which the exterior surface will not oxidize from environmental exposure.

The solution described in the patent is suitable for using the surface of corroding steel to determine the corrosion rate. A significant difference between the mentioned application and the present invention is that it solves the limitation of the tested surface (to a definable value) by placing the counter and reference electrodes required for the measurement very close to the surface in a specific geometry (rectangle) and thus defining the size of the used surface area of the opposite-side working electrode. The method is not suitable for the use of built-in electrodes for industrial purposes.

The object of the present invention was essentially to develop a more accurate, economical method and measuring arrangement than the previous methods for determining the corrosion rate of pipelines, which also allows for less frequent replacement of electrodes.

It has been realized that the disadvantages of the LPR measurement method can be significantly reduced by the method according to the invention if one of the electrodes of the monitoring system is the pipe wall itself and three additional probes are installed axially in a line next to each other where the two outer probes limit the range of the middle one approximately symmetrically to the distance between the probes. It has also been realized that if the corrosion rate of the pipe wall is measured instead of the corrosion rate of the probe materials a more realistic representation of the corrosion rate and a more accurate result can be obtained as compared to the previously known solutions. Advantageously, the metal material of the probes is formed of corrosion-resistant metal. It has further been realized that by adjusting the surface polarized by the middle counter electrode as described in the present invention, the corrosion rate can be determined more accurately as both the intensity of the polarizing current and the size of polarized surface are known.

Accordingly, the present invention is a method for determining the calibration constant of a measuring arrangement for determining the internal corrosion rate of steel pipelines. This is preferably done by using linear polarization resistance measurement (LPR) and/or electrochemical impedance spectroscopy (EIS), where the solution resistance is preferably determined by EIS measurement and the value of the polarization resistance obtained by the LPR method is corrected with this value. In the process, two outer and one middle probe are used through the wall of the pipeline galvanically isolated from the pipeline. The probes contain counter electrodes and at least the middle probe also contains a reference electrode. The polarization resistance is determined by the first equation:

$$R_P = \frac{(E - E_{corr})}{J}$$

where $(E - E_{corr})$ is the polarized potential value and the corrosion current $(J_{corr})$ is determined by the second equation under laboratory conditions.

$$R_P = \left(J_{corr} 2{,}303\left(\frac{1}{b_A} - \frac{1}{b_C}\right)\right)^{-1}$$

In the process, a pipeline consisting of three pipe sections, two outer pipe sections and a middle pipe section is used. The probes are inserted into each section of the pipeline in a line along the generating line of the steel pipeline, equidistant from each other. The distance is at most 150% of the diameter of the pipeline. The boundaries of the pipe sections are formed at half the distance between the probes. The middle probe is placed in the middle pipe section at half the distance between the outer probes. During the procedure, a calibration measurement is first performed on a calibration model. During this, the pipe sections are galvanically separated from each other. The counter electrodes of the outer probes are in an unpolarized condition. In determining the polarization resistance (LPR), the rest corrosion potential is measured between the reference electrode and the pipeline at ground potential. The voltage applied between the counter electrode of the middle probe and the ground potential is then chosen so that the polarization of the pipe with respect to the reference electrode is to be ±5-20 mV in relation to the corrosion potential. The value of the polarized potential ($E-E_{corr}$) between the reference electrode of the middle probe and the pipeline connected to the ground potential and the current (J) thus generated is measured. From the measurement results, the polarization resistance ($R_p$) is determined by the first equation. The solution resistance is then determined by impedance spectroscopy, followed by the polarization resistance per unit area corrected by the ohmic resistance of the solution. Then the corrosion current ($J_{corr}$) is calculated using the second equation, from which the corrosion rate is determined. After that field conditions are modeled under laboratory conditions by terminating the galvanic isolation between the pipe sections, leaving the electrical connection of the middle probe used in the calibration measurement unchanged, and coupling the counter electrodes of the two outer probes in parallel. A voltage is applied between the counter-electrodes coupled in parallel and the ground potential so that the value of the polarization resistance determined by the output current and the measured polarization on the middle probe is substantially equal to the value of the polarization resistance determined in the calibration measurement. The calibration constant of the system is then determined by calculating the quotient of the values of the current intensity measured on the two outer and the middle probes.

The present invention further provides a method for determining the internal corrosion rate of steel pipelines under field conditions using the calibration constant determined by the method described above. During this method two outer probes and one middle probe are used through the wall of the pipeline, galvanically isolated from the pipeline. The probes include counter electrodes and at least the middle probe also contains a reference electrode. The annual corrosion rate is determined by the third equation:

$$K = \frac{J_{corr} M_{Fe}}{AnF} s$$

where K is the corrosion rate, n is the oxidation number of the corrosion process for iron and steels, F is the Faraday constant, $M_{Fe}$ is the molar mass of iron, A is the corroding surface (dπl) where l is the distance of the sensors and s is the number of seconds in a year. The probes are inserted into the pipeline in a line along the generating line of the steel pipeline, equidistant from each other. The distance is at most 150% of the diameter of the pipeline. The middle probe is placed in the pipeline at half the distance between the outer probes. The rest corrosion potential is measured. Then the currents applied to the middle and outer probes are adjusted at different values so that the potential generated on the reference electrode is between 5-20 mV and their proportions correspond to the value of the calibration constant. By maintaining this condition, the polarized potential is measured between the reference electrode and the ground potential, which is preferably chosen to be ±5-20 mV relative to the corrosion potential. Using the current applied to the middle probe and the polarization values calculated from the potential of the reference electrode, the polarization resistance of the space of the middle probe is calculated. From the high-frequency (1-10 kHz) electrochemical impedance spectroscopic data, the solution resistance is calculated in the same arrangement also for the electrochemical impedance measurements. The quotient of the currents applied to the two outer probes and the middle probe is set equal to the value of the calibration constant. The solution resistance is calculated with respect to the middle probe, this value is used for correcting the value of the polarization resistance. The corrected polarization resistance value thus obtained is calculated for the surface area polarized by the middle probe. After determining the ($J_{corr}$) corrosion current, the annual corrosion rate is determined by the third equation.

The present invention further provides a method for determining the internal corrosion rate of steel pipelines using the methods described above. During this, the calibration constant is determined under laboratory conditions. Then, using the calibration constant, field conditions are modeled under laboratory conditions and the corrosion rate is determined. The corrosion rate is then determined under field conditions in the same manner as under laboratory modeling.

The present invention further provides a measurement arrangement for determining the calibration constant and corrosion rate for the internal corrosion rate of steel pipelines under laboratory and field conditions by using the methods described above. The arrangement consists of a polarizing and measuring unit having a two-channel power output, a potential-measuring input and a ground connection, a control and data storage unit, and three probes provided with counter-electrodes. At least one probe is also provided with a reference electrode. The pipeline consists of three, two outer and one middle pipe section. The probes are arranged in the pipeline sections in a line along the generating line of the steel pipeline, equidistant from each other. The distance between them is at most 150% of the diameter of the pipeline. The section boundaries are formed at half the distance of the probes. The electrodes are electrically isolated from each other and from the pipeline. The middle probe located in the middle pipe section consists of a reference electrode and a counter electrode. Its reference electrode is connected to the input of the potential meter and its counter electrode is connected to the first power output. The pipeline is coupled to the ground connection. In the case of a calibration measurement arrangement under laboratory conditions, the pipe sections are galvanically separated from each other, preferably with spacers inserted in the pipeline. The outer probes are fixed in the pipeline in an unpolarized state. In the case of modeling field conditions under laboratory conditions and measuring under field conditions, the individual pipe sections are galvanically connected to each other. The counter electrodes of the outer probes are combined and connected to the second power output. The output of the control and data storage unit is connected to the input of the polarizing and measuring unit.

Detailed description of the invention will be given with reference to the accompanying Figures.

Figure 1:
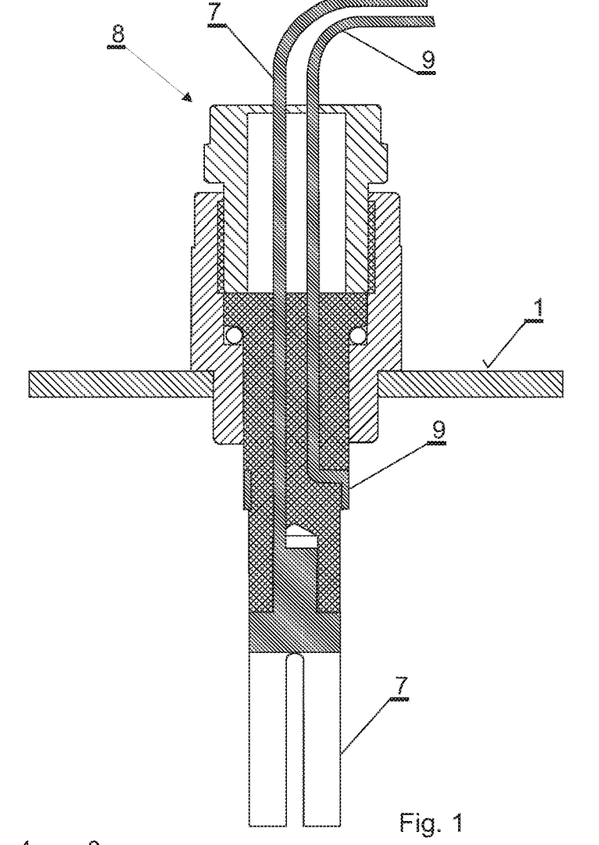
FIG. 1 shows the side view partly in section of a possible design of the probe.
Figure 2:
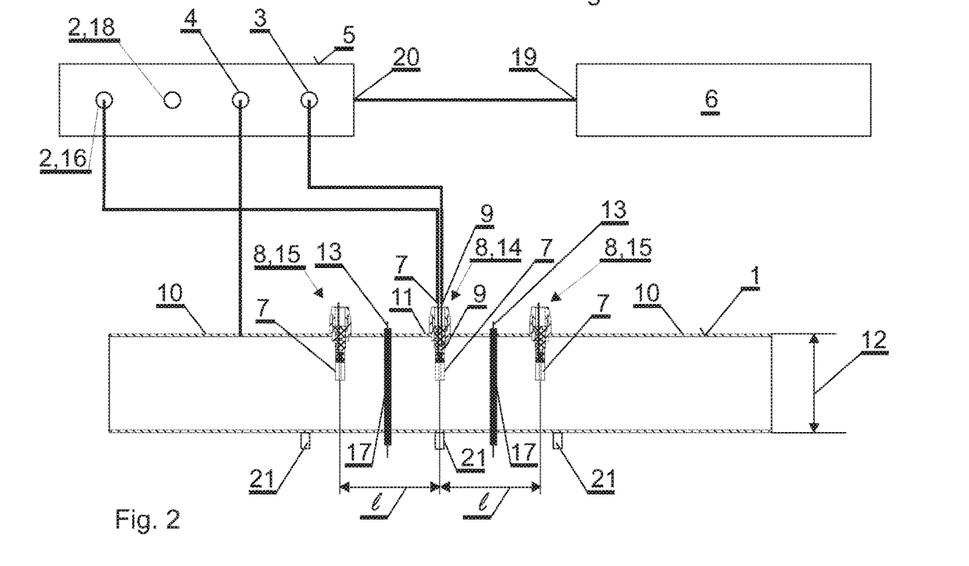
FIG. 2 is a schematic representation of a calibration measurement arrangement.
Figure 3:
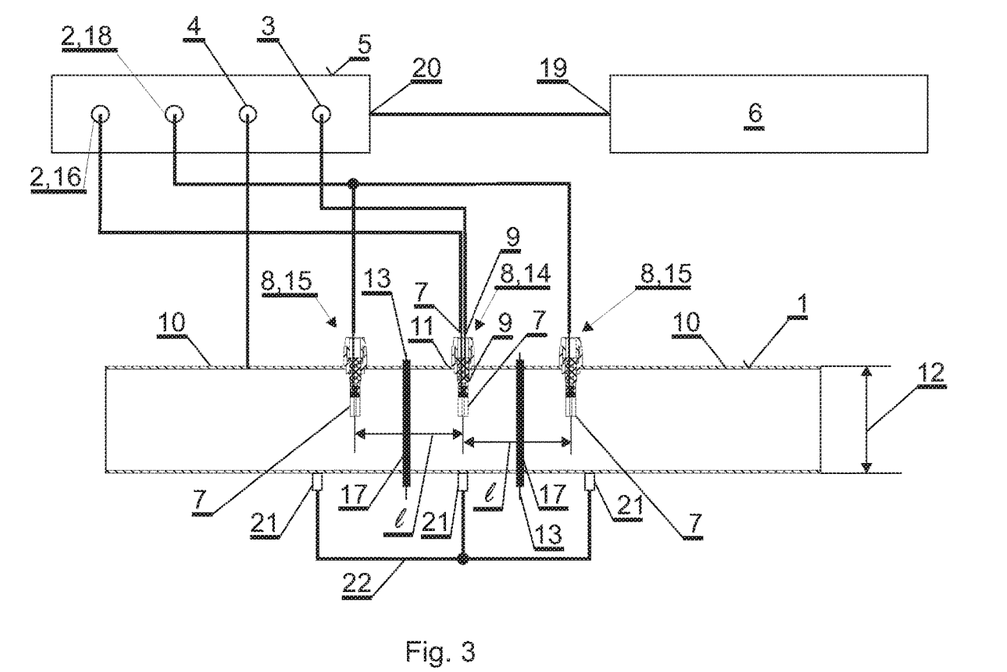
FIG. 3 is a schematic representation of a measurement arrangement for modeling field conditions under laboratory conditions.

The method according to the invention is applicable to determine the internal corrosion rate of steel pipelines 1. To implement the method a suitable measuring arrangement has also been developed. To this a method has been developed for determining a calibration constant under laboratory conditions that can be used to determine the corrosion rate of steel pipes in the field with high accuracy. Under laboratory conditions, the process is performed by using linear polarization resistance measurement (LPR) and preferably using electrochemical impedance spectroscopy (EIS). With the latter, the solution resistance is determined and the value of the polarization resistance obtained by measuring the linear polarization resistance is corrected with this value. During the measurement, two outer probes 15 and a middle probe 14 are used through the wall of the pipeline 1, galvanically isolated from the pipeline 1. The probes 8 comprise counter electrodes 7 and at least the middle probe 14 comprises a reference electrode 9 too (FIG. 1). A pipeline 1 consisting of three pipe sections, two outer pipe sections 10 and a middle pipe section 11 is used. The probes 8 are inserted in a line along the generating line of the steel pipeline 1 in each pipe section 10,11 of the pipeline 1 at equal distances from each other. The distance is at most 150% of the diameter 12 of the pipeline 1, preferably the same as the length of diameter 12. By diameter 12 the inner diameter of the pipe is meant. In a given case it does not mean significant inaccuracy if the distance corresponds to the outside diameter during the measurement. Naturally, the arrangement of the probes 8 may be different from the distance proposed, they may be even further away, but this can degrade the accuracy of the measurement. The boundaries 13 of the pipe sections 10, 11 are formed at half the distance between the probes 8. The middle probe 14 placed in the middle pipe section 11 is arranged in the middle pipe section 11 at half the distance between the outer probes 15. In the procedure, a calibration measurement is first performed under laboratory conditions on a calibration model. During this, the pipe sections 10, 11 are galvanically separated from one another. The counter electrodes 7 of the outer probes 15 are left in an unpolarized state (FIG. 2). In determining the polarization resistance (LPR), the rest corrosion potential is measured between the reference electrode 9 and the pipeline 1 connected to the ground potential. The voltage—coupled between the counter electrode 7 of the middle probe 14 and the ground potential—used for the measurement, is then chosen to be ±5-20 mV with respect to the corrosion potential. The value of the polarized potential ($E-E_{corr}$) is measured between the reference electrode 9 of the middle probe 14 and the pipeline 1 connected to the ground potential, and the current (J) thus obtained is measured. From the results of the measurement the polarization resistance ($R_p$) is determined by the first equation:

$$R_P = \frac{(E - E_{corr})}{J}$$

where $E-E_{corr}$ is the difference between the polarized potential and the corrosion (rest) potential of a corroding metal surface, J is the polarization current for the actual polarized potential and $R_P$ is the polarization resistance. After that the solution resistance is determined by impedance spectroscopy (EIS) then the polarization resistance per unit area corrected with the ohmic resistance of the solution. The corrosion current ($J_{corr}$) is then calculated using the second equation:

$$R_P = \left(J_{corr} 2{,}303 \left(\frac{1}{b_A} - \frac{1}{b_C}\right)\right)^{-1}$$

from the result of which the corrosion rate is determined. In the equation $b_A$ and $b_C$ are the so-called anodic and cathodic decadic Tafel slopes, their values are conventionally $b_A=0.06$V and $b_C=-0.12$V. Then field conditions are modeled under laboratory conditions so that galvanic separation is terminated between tube sections 10, 11. The electrical coupling of the middle probe 14 used in the calibration measurement is left unchanged. The counter electrodes 7 of the two outer probes 15 are coupled in parallel (FIG. 3). A voltage is applied between the counter electrodes 7 connected in parallel and the ground potential so that the value of the polarization resistance determined by the output current of the middle probe 14 and the measured polarization substantially equal to the polarization resistance determined in the calibration measurement. The calibration constant of the system is then determined by calculating the quotient of the values of the current intensity measured on the two outer probes 15 and the middle probe 14.

Further, a method according to the invention is provided for determining the internal corrosion rate of steel pipelines 1 under field conditions using the calibration constant determined by the method described above. During this method two outer probes 15 and one middle probe 14 are used through the wall of the pipeline 1, galvanically isolated from the pipeline 1. The probes 8 also include counter electrodes 7 and at least the middle probe 14 contains a reference electrode 9. The probes 8 are inserted into the pipeline 1 in a line along the generating line of the steel pipeline 1, equidistant from each other. The distance is at most 150% of the diameter 12 of the pipeline 1. The middle probe 14 is placed in the pipeline 1 at half the distance between the outer probes 15. The rest corrosion potential is measured. Then the currents applied to the middle probe 14 and the outer probes 15 are adjusted at different values so that the potential generated by them is between 5-20 mV and their proportions correspond to the value of the calibration constant. By maintaining this condition, the polarized potential is measured between the reference electrode 9 and the ground potential. It is preferably chosen to be ±5-20 mV relative to the corrosion potential. Using the current applied to the middle probe 14 and the polarization values calculated from the potential of the reference electrode 9, the polarization resistance of the space of the middle probe 14 is calculated. From the high-frequency (1-10 kHz) electrochemical impedance spectroscopic data, the solution resistance is calculated in the same arrangement also for the electrochemical impedance measurements. The quotient of the currents applied to the two outer probes 15 and the middle probe 14 is set equal to the value of the calibration constant. The solution resistance is calculated with respect to the middle probe 14, the value of which is used for correcting the value of the polarization resistance. The corrected polarization resistance value thus obtained is calculated for the surface area polarized by the middle probe 14. After determining the ($J_{corr}$) corrosion current, the annual corrosion rate is determined by the third equation.

$$K = \frac{J_{corr} M_{Fe}}{AnF} s$$

In the equation K is the corrosion rate (its dimension: [mass/time/length$^2$], characteristic unit of measurement: g/year/cm$^2$), A is the corroding surface (d$\pi$l), where l is the distance of the sensors, n is the oxidation number of the corrosion process, its value for iron and steels is 2, F is the Faraday constant its value is 96494 As/mol, $M_{Fe}$ is the molar mass of iron 55.845 g/mol, and s is the number of seconds in a year: 31536000.

In a given case the distance of the sensors l is equal to the diameter 12 of the pipeline 1. Thus, the equation for determining the corrosion rate:

$$K = J_{corr} \times 9126/A$$

The present invention further relates to a measuring arrangement for determining the calibration constant for the internal corrosion rate of steel pipelines 1 for implementing the methods described above. The arrangement consists of a polarizing and measuring unit 5 having a two-channel power output 2, a potential measuring input 3, and a ground connection 4; a control and data storage unit 6, and three probes 8 provided with counter-electrodes 7.

The polarizing and measuring unit 5 is a unit with a two-channel power output 2, which has two power outputs 2, the output voltage of which can be set independently of one another in relation to the common earth connection 4. The at least one potential measuring input 3 also measures the voltage with respect to the earth connection 4. The earth connection 4 is connected to the pipe 1.

The control and data storage unit 6 controls and evaluates the measurement process to be performed with the polarizing and measuring unit 5. It also stores and, where appropriate, evaluates the data and ensures its transmission.

The measuring system consists of three probes 8, which are completely identical in design but differ in their connection. The distance between the probes 8 should not exceed 150% of the inner diameter 12 of the pipeline 1. The probes 8 have two electrodes, the counter electrode 7 and the reference electrode 9. The counter electrode 7 and the reference electrode 9 are electrically isolated from each other and from the pipeline 1. The counter electrodes 7 are formed of a metal electrode having a relatively large surface area. Preferably, but not necessarily, they are made of stainless steel, possibly structural steel. Its function is to close the circuit polarizing the pipeline 1. The reference electrode 9 is a ring with a smaller surface area, made of stainless steel or some other metal, the potential of which is stable in the medium conveyed in the pipeline 1. Its function is to measure the potential of pipeline 1. Possibly a commercial reference electrode 9 (e g. silver/silver chloride) may also be used. In the real embodiment, the connection of the reference electrode 9 also runs in the encasement of probe 8, but in FIG. 1 it is represented outside for better traceability. Although the design of the three probes 8 is exactly the same, their use is different. The reference electrode 9 of the middle probe 14 is always connected to the input 20 of the polarizing and measuring unit 5. If the polarizing and measuring unit 5 comprises several potential measuring inputs 3, the reference electrode 9 of the two outer probes 15 can also be connected in order to increase the accuracy of the measurement and evaluation, but this is not necessary by all means. This embodiment is not shown as it is unambiguous.

The counter electrodes 7 of the probes 8 are electrochemically polarized relative to the inner wall of the pipeline 1 and as a result little current will flow between the counter electrodes 7 and the wall of the pipeline 1. Each counter electrode 7 will polarize a certain part of the wall of the pipeline 1. The counter electrode 7 of the two outer probes 15 will limit the area that can be polarized by the counter electrode 7 of the middle probe 14. The proportions of the surfaces polarized by the counter electrode 7 of the two outer probes 15 and the counter electrode 7 of the middle probe 14 can be varied by controlling the current applied to the counter electrode 7 of the two outer probes 15 and the counter electrode 7 of the middle probe 14. The aim of it is to polarize by the counter electrode 7 of the middle probe 14 exactly the half of the tube wall surface area enclosed by the counter electrode 7 of the two outer probes 15. The adjustment can be made by varying the values of the potentials applied to the first power output 16 polarizing the counter electrode 7 of the two outer probes 15 and the counter electrode 7 of the middle probe 14, and to the second power output 18. Optimal ratios are obtained in the calibration measurement procedure. Corrosion rates can be determined by any of the well-known electrochemical methods, but for practical reasons it is preferable to use Linear Polarization Measurement (LPR) and/or Electrochemical Impedance Spectroscopy (EIS), or a combination of the two (e.g., the solution resistance is determined by EIS measurement and the polarization resistance value obtained by the LPR method is corrected with this value).

Thus, as described above, at least one probe 8 is further provided with a reference electrode 9. The pipeline 1 consists of three pipe sections, namely two outer pipe sections 10 and one middle pipe section 11. The probes 8 are inserted into each section 10, 11 of pipeline 1 in a line along the generating line of the steel pipeline 1, equidistant from each other. The distance is at most 150% of the diameter 12 of the pipeline 1. The boundaries 13 of the pipe sections 10, 11 are formed at half the distance between the probes 8. The counter electrodes 7 are electrically isolated from each other and from the pipeline 1. The middle probe 14 located in the middle tube section 11 consists of 9 reference electrodes and 7 counter electrodes. The reference electrode 9 is connected to the potential meter input 3 and the counter electrode 7 is connected to the first power output 16. The pipeline 1 is coupled to the ground connection 4. In the case of a calibration measurement arrangement (FIG. 2), the pipe sections 10, 11 are galvanically separated from each other, preferably with spacers 17 inserted in the pipeline 1. The outer probes 15 are fixed in the pipeline 1 in an unpolarized state. In the case of modeling field conditions under laboratory conditions the individual pipe sections 10, 11 are galvanically connected to each other. The counter electrodes 7 of the outer probes 15 are galvanically connected and coupled to the second power output 18. The output 19 of the control and data storage unit 6 is connected to the input 20 of the polarizing and measuring unit 5. With this arrangement, the field conditions are modeled so that connection points 21 are formed on the pipe sections 10, 11. These are galvanically coupled to the short circuit 22 during modeling of field conditions under laboratory conditions (FIG. 3). Naturally, the galvanic connection between the individual pipe sections 10, 11 can also be established by removing the spacers 17, but the application of the short circuit 22 is simpler and faster. Optionally, the outer probes 15 provided with counter electrodes 7 are also provided with reference electrodes 9. In this case, each of the reference electrodes 9 should in principle measure the same value, disregarding the local variations in the ohmic potential drop of the solution depending on the calibration constant. The measurement with the reference electrodes 9 of the outer probes 15 may be an additional control data of the linearity of the system, which can be used for compensating the decrease in accuracy caused by the application in contaminated industrial waters.

In order to determine the optimal current output ratio between the first power output 16 and the second power output 18 (counter electrodes 7 in the probes 8), a calibration measurement system has been developed to determine the calibration constant. A schematic drawing of this is shown in FIG. 2. This arrangement models the geometrical conditions of the system, with the difference that two insulating spacers 17 are symmetrically inserted in the pipeline 1 between the probes 8, and connection points 21 are formed to provide cable connection possibilities for short-circuiting the insulating spacers 17. The calibration lay-out has two measurement modes: the real field measurement mode and the isolated calibration mode. If the insulating spacers 17 are short-circuited by the short-circuit 22, the system measures essentially as if it were measured on the continuous pipeline 1. When the short circuit 22 is removed, the middle pipe section 11 becomes electrically isolated from the adjacent outer pipe sections 10. In this case, the corrosion rate in the middle tube section 11 can be measured in a well-defined separate area by using one of the electrochemical corrosion rate measurement methods described. If the exact corrosion rate of the middle pipe section 11 is determined in the calibration mode, we can compare this value with the corrosion rate value obtained in the real field mode and, if necessary, the measurement input parameters (potential and current ratios of the middle probe 14 and the counter electrodes 7 of the two outer probes 15) can be changed accordingly.

The solution according to the invention is illustrated by the following embodiment.

In the first step, the current ratios, i.e., the calibration constant are determined by means of the measuring arrangement of the measuring device and the method according to the invention. The calibration constant is determined in the measurement mode shown in FIG. 2. In this example, the inner diameter 12 of the pipe is 100 mm, and the length of the pipe sections 10, 11 isolated by the spacers 17 is also 100 mm. Equality between the diameter 12 of the pipe 1 and the distance between the probes 8 is a desirable requirement, but in principle the calibration constant can be determined in a similar manner for any pipe diameter and diameter/electrode distance ratio. The surface area of the middle pipe section 11 isolated by the spacers 17 is 3140 cm². Rest potential measurement in relation to the ground potential is several times 10 mV-100 mV. The electrode design described earlier is used because designing the measurement arrangement with the commonly used, so-called non-standard electrode would be too complicated. It would cause a safety problem at high pressures. First, the polarization resistance (LPR) is determined. To this a ±5-20 mV offset (polarization) is performed in the potential value in relation to the corrosion ("rest") potential measured at the reference electrode 9 of the middle probe 14, and the resulting current is measured with high internal resistance voltmeter (>10 Mohm). The measurement results are as follows:

$(E-E_{corr})J$

| Polarization/V | Current/A |
|---|---|
| 0.002 | 0.00274 |
| 0.004 | 0.00548 |
| 0.006 | 0.00823 |
| 0.008 | 0.0109 |
| 0.01 | 0.01372 |
| 0.012 | 0.01646 |
| 0.014 | 0.01921 |

In practice, this measurement is usually performed automatically, where a sawtooth signal with a frequency of 0.1-1 Hz is usually used to change the voltage (polarization), the amplitude of which is changed within the voltage range. From the measurement results, the polarization resistance is determined by the first equation:

$$R_P = \frac{(E - E_{corr})}{J}$$

the result of which is 0.729 Ohms. The solution resistance is then determined by impedance spectroscopy in a known manner with measurements between 1 and 10 kHz. The solution resistance is 0.08 Ohm, so the polarization resistance corrected by the ohmic potential drop of the solution is 0.729−0.08=0.649 Ohm.

To determine the corrosion current the second equation is used:

$$R_P = \frac{(E - E_{corr})}{J}$$

$b_A = 0.06$ V and $b_C = -0.12$ V. $R_p = 0.649$ Ohm cm²

$R_P = (J_{corr} 57, 6)^{-1}$ that is, $J_{corr} = 2.68$ mA

By using the value of the corrosion current the corrosion rate is calculated with the third equation:

$$K = \frac{J_{corr} M_{Fe}}{AnF} s$$

$K = J_{corr} \times 9126/A$  $K = J_{corr} \times 9126/314$ the result of which is 0.078 g/year/cm².

In the equation K is the corrosion rate (its dimension: [mass/time/length²], characteristic unit of measurement: g/year/cm²), A is the corroding surface (dπl) (characteristic unit of measurement cm²).

For the 10 cm middle pipe section 11, it is 314 cm², n is the stoichiometric number (oxidation number) of the corrosion process, its value for iron and steels is 2, F is the Faraday constant its value is 96494 As/mol, $M_{Fe}$ is the molar mass of iron: 55.845 g/mol, and s is the number of seconds in a year: 31536000.

The pipe sections 10, 11 are then connected to the short circuit 22 and the two outer probes 15 are coupled in parallel to the second power output 18. Then it is determined how many times the current delivered to the two outer probes 15 and the middle probe 14 should be applied, so that the current output at the middle probe 14 and the measured polarization—the potential deviation measured at the reference electrode 9 in relation to the rest, non-polarized state— and the polarization resistance calculated from these data should be as close as possible to the measured values shown in the table, and the previously calculated polarization resistance value 0.729 Ohm. The quotient of the current values applied to the two outer probes 15 and middle probe 14 is then recorded. This value will be the calibration constant of the system.

Figure 4:
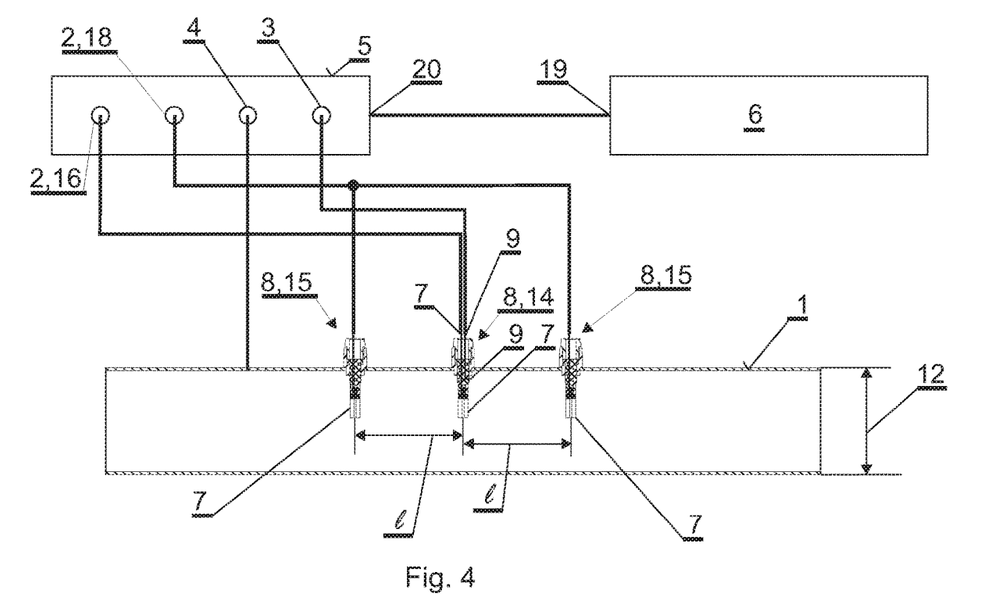
FIG. 4 is a schematic representation of an arrangement for performing measurement under field conditions.

The corrosion rate is then determined under field conditions using the calibration constant. Under field conditions, as shown in FIG. 4, the pipe is not segmented by the insulating spacers 17. Thus, when measuring is performed under field conditions, the two outer probes 15 are also connected, as shown in FIG. 3. The currents applied to the middle probe 14 and the outer probes 15 are adjusted so that their ratios correspond to the value of the calibration constant. By maintaining this condition, the current is measured at several different polarization values (as shown in the table) and the polarization resistance of the space of the middle probe 14 is calculated using the polarization resistance values calculated from the current applied to the middle probe 14 and the potential of the reference electrode 9. From the high-frequency (1-10 kHz) electrochemical impedance spectroscopic data, the solution resistance is calculated in the same arrangement. For electrochemical impedance measurements, we also maintain that the quotient of the currents applied to the two outer probes 15 and the middle probe 14 must match the value of the calibration constant. By keeping this, the solution resistance to the middle probe 14 can be calculated with high accuracy, by the value of which the value of the polarization resistance is corrected. The corrected polarization resistance value thus obtained is calculated for the surface area polarized by the middle probe 14. The value of this surface can be easily calculated by the relation A=dπl, where d is the diameter 12 of the pipeline 1, l is the distance of the sensors 1 which is also equal to the distance between the probes 8. If the distance between the electrodes is not equal to the diameter then another equation is to be applied as A=dπl, where l is the distance of the sensors 1. The value obtained is thus the polarization resistance per unit area, from which the corrosion rate is calculated using the first, second and third equations.

It should be emphasized that if the geometry of the operating pipeline meets the requirements (i. e. the distance between the probes 8 is substantially proportional to the diameter 12 of the pipe), then the geometry of the calibration measuring device and the field measuring device is similar. Thus, the calibration constant can be applied to a pipe 1 of any diameter if the distance between the probes 8 is substantially equal to the inner diameter 12 of the pipe 1.

Advantages of the measuring system and calibration measuring device and method according to the invention over currently operating industrial systems:

The working electrodes (whose corrosion rate is determined) of the currently operating industrial corrosion rate measurement systems (LPR, EIS and ER systems) are located in the probes. Thus, the probes do not measure the corrosion rate of the tube wall, but the corrosion rate of the working electrodes. Therefore, it is not possible to determine the surface area of the pipe wall to which the measurement results apply. Because the material quality, geometry, history (time spent in the system), surface condition, etc. of the working electrodes may differ significantly from the relevant parameters of the pipe wall, the measurement result gives information about the corrosion rate of the pipe wall only with a significant uncertainty. The system according to the invention, on the other hand, performs the measurement directly on the pipe wall and, as a result, gives its corrosion rate, consequently it gives significantly more reliable results.

In currently operating systems, the electrodes break down relatively quickly (partly due to corrosion, partly geometric, partly material thickness reasons), so they typically need to be replaced every 6-12 months. After replacement, the material of the new electrodes is completely different from that of the already worn electrodes. The lifetime of the electrodes in the probes is restricted because they must be made of a material which corrodible to some extent. In the system according to the invention, the corrosion of the pipe wall is measured directly by polarizing the pipe wall, the electrodes (counter electrode and reference electrode) can be made of stainless steel, which makes several years of reliable operation possible, significantly improving the system reliability, availability and the operating costs can be reduced significantly.

Currently operating systems (LPR, EIS and ER systems) provide inaccurate results due to significant localized corrosion. On the one hand, the system according to the invention is able to detect the presence of local corrosion (by monitoring the changes in the pipe wall potential over time), and on the other hand, it provides correct data on the average value of the corrosion rate even in the case of significant local corrosion.

Current corrosion monitoring systems—with the exception of mass loss measurement systems—cannot be used in media containing hydrogen-sulfide, primarily because iron sulfide settles on surfaces and creates a conductive coating that changes the electrical resistance conditions of the probes. In the case of the system according to the invention, geometric separation can be realized (the electrodes can be at greater distances) or it is possible to install insulating elements on which iron-sulfide does not adhere, consequently, the measurement results will be satisfactory.

The invention claimed is:

1. Method for determining a calibration constant of a measuring arrangement for determining the internal corrosion rate of steel pipelines by performing a linear polarization resistance measurement (LPR) and electrochemical impedance spectroscopy measurement (EIS), where a solution resistance value is determined by the EIS measurement, and a polarization resistance value obtained by the LPR is corrected with the solution resistance value, wherein two outer and one middle probe galvanically isolated from the pipeline are used through a wall of the pipeline, the probes contain counter electrodes and at least the middle probe also contains a reference electrode, the polarization resistance ($R_p$) is determined by a first equation:

$$R_p = (E - E_{corr})/J$$

where ($E - E_{corr}$) is a polarized potential value and J is the polarization current for the actual polarized potential, and a corrosion current ($J_{corr}$) is determined by a second equation under laboratory conditions, $$R_p = (J_{corr} * 2.303 * ((1/b_A) - (1/b_c)))^{-1}$$

where $b_A$ and $b_c$ are, respectively, the values of the anodic and cathodic slope, characterized in that a pipeline (1) having a diameter (12) and three pipe sections (10, 11) comprising two outer pipe sections (10) having outer probes (15) with counter electrodes (7) and a middle pipe section (11) having a middle probe (14) with reference electrode (9) is used, said probes being inserted into each pipe section (10, 11) of said pipeline (1) in a line along a generating line of the pipeline (1), equidistant from each other, the distance is at most 150% of said pipeline diameter (12), boundaries (13)

of said pipe sections (10, 11) are formed at half the distance between said probes (8), the middle probe (14) is placed in said middle pipe section (11) at half the distance between said outer probes (15);

wherein during the method, a calibration measurement is first performed on a calibration model, while said pipe sections (10, 11) are galvanically separated from each other, said counter electrodes (7) of said outer probes (15) are in a condition free of voltage, in determining the polarization resistance the rest corrosion potential is measured between said reference electrode (9) and said pipeline (1) being at ground potential, voltage applied between said counter electrode (7) of said middle probe (14) and the ground potential during the measurement is then chosen to be ±5-20 mV in relation to the corrosion potential, and the value of the polarized potential (E–Ecorr) between said reference electrode (9) of said middle probe (14) and said pipeline (1) connected to the ground potential and the current (J) thus generated is measured, from the measurement results, the polarization resistance (Rp) is determined by the first equation, the solution resistance value is then determined by impedance spectroscopy, followed by determination of the polarization resistance value per unit area corrected by the ohmic resistance of the solution, then a corrosion current (Jcorr) value is calculated using the second equation, from the result of which the corrosion rate is determined, after that field conditions are modeled under laboratory conditions by terminating the galvanic isolation between said pipe sections (10, 11), leaving the electrical connection of said middle probe (14) used in the calibration measurement unchanged, and coupling said counter electrodes (7) of said two outer probes (15) in parallel, and a voltage is applied between said counter electrodes (7) coupled in parallel and the ground potential so that the value of the polarization resistance determined by the output current on said middle probe (14) and the measured polarization is substantially equal to the value of the polarization resistance determined in the calibration measurement, then the calibration constant of the system is determined by calculating the quotient of the values of the current intensity measured on said two outer probes (15) and said middle probe (14).

2. Method for determining the internal corrosion rate of steel pipelines under field conditions using the calibration constant determined in the method according to claim 1, wherein the two outer probes (15) and the one middle probe (14) are used through a wall portion of said pipeline (1), galvanically isolated from said pipeline (1), said probes contain counter electrodes (7) and at least said middle probe contains a reference electrode (9), the annual corrosion rate is determined by the third equation:

$$K = \frac{J_{corr} M_{Fe}}{AnF} s$$

where K is the corrosion rate, n is the oxidation number of the corrosion process for iron and steels, F is the Faraday constant, $M_{Fe}$ is the molar mass of iron, A is area of corroding surface in the middle pipe section and s is the number of seconds in a year, characterized in that said probes (8) are inserted into said pipeline (1) in a line along the generating line of said steel pipeline (1), equidistant from each other, the distance is at most 150% of the diameter of said pipeline (1), said middle probe (14) is placed in said pipeline (1) at half the distance between said outer probes (15) the rest corrosion potential is measured, then currents applied to said middle probe (14) and said outer probes (15) are adjusted at different values so that the potential generated by them is between 5 and 20 mV and their proportions correspond to the value of the calibration constant, by maintaining this condition, the polarized potential is measured between said reference electrode (9) and the ground potential, which is preferably chosen to be ±5-20 mV relative to the corrosion potential, and using the current applied to said middle probe (14) and the polarization values calculated from the potential of said reference electrode (9), the polarization resistance of the space of said middle probe (14) is calculated, from the high-frequency (1-10 kHz) electrochemical impedance spectroscopic data the solution resistance is calculated in the same arrangement, also for the electrochemical impedance measurements, the quotient of the currents applied to said two outer probes (15) and said middle probe (14) is set equal to the value of the calibration constant, then the solution resistance is calculated with respect to said middle probe (14), this value is used for correcting the value of the polarization resistance, the corrected polarization resistance value thus obtained is calculated for the surface area polarized by said middle probe (14) and after determining the corrosion current ($J_{corr}$), the annual corrosion rate is determined by the third equation.

3. The method for determining the internal corrosion rate of steel pipelines using the method according to claim 2, characterized in that during the method the calibration constant is determined under laboratory conditions, then by using the calibration constant field conditions are modeled under laboratory conditions and the corrosion rate is determined, after that in the same manner as in laboratory modeling the corrosion rate is determined under field conditions.

4. Measurement arrangement for determining the corrosion rate for internal corrosion rate of steel pipelines under laboratory and field conditions by using the method according to claim 2 wherein, the arrangement comprises a polarizing and measuring unit (5) having a two-channel power output (2), a potential-measuring input (3) and a ground connection (4), a control and data storage unit (6), and three probes (8) provided with counter-electrodes (7) where at least one probe (8) is also provided with a reference electrode (9) characterized in that said pipeline (1) consists of three, two outer pipe sections (10) and one middle pipe section (11), said probes (8) are arranged in said pipeline sections (10, 11) in a line along the generating line of said steel pipeline (1), equidistant from each other, this distance is at most 150% of the diameter (12) of said pipeline (1), the boundaries (13) of said pipe sections (10, 11) are formed at half the distance of said probes (8) said counter electrodes (7) are electrically isolated from each other and from said pipeline (1), said middle probe (14) located in said middle pipe section (11) consists of a reference electrode (9) and a counter electrode (7) its reference electrode (9) is connected to said potential measuring input (3) and its counter electrode (7) is connected to the first power output (16), further, said pipeline (1) is coupled to said ground connection (4) in the case of a calibration measurement arrangement under laboratory conditions said pipe sections (10, 11) are galvanically separated from each other, with spacers (17) inserted in said pipeline (1), said outer probes (15) arranged in said outer pipe sections (10) are fixed in said pipeline (1) in a voltage-free state, while said individual pipe sections (10, 11) are galvanically connected to each other when modelling field conditions under laboratory conditions and measuring under field conditions, and said counter electrodes (7) of said outer probes (15) are galvanically connected to each other and they are coupled to the second power output (18), further, the output (19) of said control and data storage unit (6) is connected to the input (20) of said polarizing and measuring unit (5).

5. Measurement arrangement according to claim 4 characterized in that connection points (21) are provided on said pipe sections (10, 11), and during modelling of field conditions under laboratory conditions short circuit (22) is installed between said connection points (21) of said individual pipe sections (10, 11).

6. Measurement arrangement according to claim 4 characterized in that during modelling of field conditions under laboratory conditions said spacers (17) are removed from said pipe sections (10, 11).

7. Measurement arrangement according to claim 6 characterized in that said outer probes (15) are also provided with reference electrodes (9).

8. Measurement arrangement for determining the calibration constant for internal corrosion rate of steel pipelines under laboratory and field conditions by using the method according to claim 1 wherein the arrangement comprises polarizing and measuring unit (5) having a two-channel power output (2), a potential-measuring input (3) and a ground connection (4), a control and data storage unit (6), and three probes (8) provided with counter-electrodes (7) where at least one probe (8) is also provided with a reference electrode (9) characterized in that said pipeline (1) consists of three, two outer pipe sections (10) and one middle pipe section (11), said probes (8) are arranged in said pipeline sections (10, 11) in a line along the generating line of said steel pipeline (1), equidistant from each other, this distance is at most 150% of the diameter (12) of said pipeline (1), the boundaries (13) of said pipe sections (10, 11) are formed at half the distance of said probes (8) said counter electrodes (7) are electrically isolated from each other and from said pipeline (1), said middle probe (14) located in said middle pipe section (11) consists of a reference electrode (9) and a counter electrode (7) its reference electrode (9) is connected to said potential measuring input (3) and its counter electrode (7) is connected to the first power output (16), further, said pipeline (1) is coupled to said ground connection (4) in the case of a calibration measurement arrangement under laboratory conditions said pipe sections (10, 11) are galvanically separated from each other, spacers (17) inserted in said pipeline (1), said outer probes (15) arranged in said outer pipe sections (10) are fixed in said pipeline (1) in a voltage-free state, while said individual pipe sections (10, 11) are galvanically connected to each other when modelling field conditions under laboratory conditions and measuring under field conditions, and said counter electrodes (7) of said outer probes (15) are galvanically connected to each other and they are coupled to the second power output (18), further, the output (19) of said control and data storage unit (6) is connected to the input (20) of said polarizing and measuring unit (5).

9. Measurement arrangement according to claim 8 characterized in that connection points (21) are provided on said pipe sections (10, 11), and during modelling of field conditions under laboratory conditions short circuit (22) is installed between said connection points (21) of said individual pipe sections (10, 11).

10. Measurement arrangement according to claim 8 characterized in that during modelling of field conditions under laboratory conditions said spacers (17) are removed from said pipe sections (10, 11).

11. Measurement arrangement according to claim 8 characterized in that said outer probes (15) are also provided with reference electrodes (9).

\* \* \* \* \*